(12) United States Patent
Liu (10) Patent No.: US 8,504,111 B2
(45) Date of Patent: Aug. 6, 2013

(54) ACTIVE ELECTRICAL TILT ANTENNA APPARATUS WITH DISTRIBUTED AMPLIFIER

(75) Inventor: Jigang Liu, Xi'an (CN)

(73) Assignee: Empire Technology Development LLC., Wilmington, DE (US)

( * ) Notice: Subject to any disclaimer, the term of this patent is extended or adjusted under 35 U.S.C. 154(b) by 87 days.

(21) Appl. No.: 13/125,925

(22) PCT Filed: Apr. 23, 2010

(86) PCT No.: PCT/CN2010/072108
§ 371 (c)(1),
(2), (4) Date: Apr. 25, 2011

(87) PCT Pub. No.: WO2011/130917
PCT Pub. Date: Oct. 27, 2011

(65) Prior Publication Data
US 2012/0028690 A1  Feb. 2, 2012

(51) Int. Cl.
| H04M 1/00 | (2006.01) |
| H04B 1/46 | (2006.01) |
| H04B 7/00 | (2006.01) |
| H04Q 19/06 | (2006.01) |

(52) U.S. Cl.
USPC ............ 455/562.1; 455/82; 455/78; 455/561; 455/83; 343/754; 343/817; 343/835; 343/853; 343/915; 370/276; 342/367

(58) Field of Classification Search
USPC ............ 455/78, 82–83, 561, 562.1; 343/835, 343/817, 853, 754; 342/376; 370/276
See application file for complete search history.

(56) References Cited

U.S. PATENT DOCUMENTS

| 6,591,087 | B1 * | 7/2003 | Oda ................................ 455/78 |
| 6,597,325 | B2 | 7/2003 | Judd et al. |
| 6,621,469 | B2 | 9/2003 | Judd et al. |
| 6,653,985 | B2 * | 11/2003 | Sikina et al. .................. 343/853 |
| 6,701,337 | B1 | 3/2004 | Ide |
| 6,721,544 | B1 * | 4/2004 | Franca-Neto ................... 455/83 |

(Continued)

FOREIGN PATENT DOCUMENTS

| CN | 1273443 A | 11/2000 |
| CN | 100382468 C | 4/2008 |
| JP | 2006-108731 A | 4/2006 |

OTHER PUBLICATIONS

International Patent Application No. PCT/CN2010/072108: International Search Report dated Feb. 10, 2011, 11 pages.

*Primary Examiner* — Jinsong Hu
*Assistant Examiner* — William Nealon
(74) *Attorney, Agent, or Firm* — Woodcock Washburn LLP (57) ABSTRACT

In various embodiments of the present disclosure, an apparatus for wirelessly transmitting or receiving communication signals may include multiple active elements to transmit or receive communication signals wirelessly; and multiple active modules correspondingly coupled to the multiple active elements and configured to cooperate with respective ones of the multiple active elements; in which the respective ones of the multiple active modules include a power amplifier configured to amplify communication signals to be transmitted and a low noise amplifier configured to amplify communication signals received, and in which the respective ones of the multiple active modules further include a first phase shift configured to shift phases of the communication signals to be transmitted and a second phase shift configured to shift phases of the communication signals received. Other embodiments may be described and claimed.

17 Claims, 5 Drawing Sheets

U.S. PATENT DOCUMENTS

| | | | |
|---|---|---|---|
| 7,071,884 B2* | 7/2006 | Choi | 343/702 |
| 2004/0204109 A1* | 10/2004 | Hoppenstein | 455/562.1 |
| 2005/0078047 A1* | 4/2005 | Chiang et al. | 343/853 |
| 2007/0285312 A1* | 12/2007 | Gao et al. | 342/367 |
| 2008/0175175 A1 | 7/2008 | Oren et al. | |

* cited by examiner

ACTIVE ELECTRICAL TILT ANTENNA APPARATUS WITH DISTRIBUTED AMPLIFIER

CROSS-REFERENCE TO RELATED APPLICATIONS

This application is the National Stage of International Application No. PCT/CN2010/072108, filed Apr. 23, 2010, the disclosure of which is incorporated herein by reference in its entirety.

TECHNICAL FIELD

The present disclosure generally relates to the wireless communication and, in particular, antenna systems for wireless communication networks.

BACKGROUND

Advances in wireless communication technology have contributed to wide spread deployment of wireless communication networks. Examples of such wireless communication networks may include Global System for Mobile Communication (GSM), Code Division Multiple Access (CDMA), and Wideband Code Division Multiple Access (WCDMA), Worldwide Interoperability for Microwave Access (WiMAX), Long Term Evolution (LTE), and so forth. Antenna is a relatively important element in these wireless communications networks, particularly in base stations. An antenna assembly may include an antenna array coupled with one or more active components, which may include a power amplifier (PA), a low noise amplifier (LNA), and various filters and duplexers.

To generate the amount of power required for the antenna array to transmit the radio frequency (RF) signals over the designated coverage area, cavity filters that are relatively large in size may often be used in power amplifiers, making them ill-suited for out-door installations. As such, a typical wireless network base station may configure the active components, including the power amplifiers, as an indoor unit. A feedline, also known as a feed, sometimes more than 100 feet long, may be used to carry the energy generated by the power amplifiers, including the RF signals, to the antenna array.

The length of the feedlines may adversely affect the sensitivity and balance between the RF signals to be transmitted and the RF signals received. For example, in a base station antenna assembly with 6 active elements, the power amplifier may generate 20 watts of power. However, each active element may only have a power of transmission of 2 watts when taking into account of the internal transmission loss. In order to shorten the length of the feedline, some base stations may install all or part of the active components, including the amplifiers, as an outdoor unit, near the antenna array. A jumper wire may be used to couple the active components with the antenna array. However, this may not completely address the problem because there may still be significant signal loss attributable to the jumper wire.

Additionally, more and more directional antenna arrays are being replaced by tilt adjustable antenna arrays. Base stations may control and adjust the antenna tilt angle either mechanically or electrically. Mechanical tilt may refer to physically tilting the antenna structure to reach a desired beam angle. Electrical tilt may refer to tilting the direction of the signal by manipulating the phases of the signal, which may be accomplished by adjusting the length of the feedline leading to the active elements of the antenna array, typically through a motor. However, the resolution of tilt angle adjustment made by adjusting the length of the feedline, through a motor, may be relatively coarse, usually about 1 degree.

With large-scale application and deployment of wireless communication systems, cost control may become increasingly important. Often, the power amplifiers may contribute a relatively significant percentage to the total system cost due to the fact that the cost of the power amplifiers may increase exponentially with the increase of the transmission power. In addition, other components of the antenna assembly, such as dividers, combiners and duplexers, may also need to be designed to operate under the high power rating or with high power tolerance, which may also undesirably drive up the cost of the total system.

SUMMARY

In various embodiments of the present disclosure, an apparatus for wirelessly transmitting or receiving communication signals may include multiple active elements to transmit or receive communication signals wirelessly; and multiple active modules correspondingly coupled to the multiple active elements and configured to cooperate with respective ones of the multiple active elements; in which the respective ones of the multiple active modules include a power amplifier configured to amplify communication signals to be transmitted and a low noise amplifier configured to amplify communication signals received, and in which the respective ones of the multiple active modules further include a first phase shift configured to shift phases of the communication signals to be transmitted and a second phase shift configured to shift phases of the communication signals received.

In various embodiments of the present disclosure, a method for wirelessly transmitting a signal by an antenna assembly may include receiving by a multi-path power divider, the signal for transmission; dividing by the multi-path power divider, the signal for transmission to produce multiple divided signals for provision to multiple active modules respectively; phase-shifting and amplifying by respective ones of the multiple active modules, the multiple divided signals respectively to produce multiple amplified signals; and transmitting by multiple active elements, respective ones of the multiple amplified signals into free space.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

In various embodiments of the present disclosure, an apparatus for wirelessly transmitting or receiving communication signals may include multiple active elements to transmit or receive communication signals wirelessly; and multiple active modules correspondingly coupled to the multiple active elements and configured to cooperate with respective ones of the multiple active elements; in which the respective ones of the multiple active modules include a power amplifier configured to amplify communication signals to be transmitted and a low noise amplifier configured to amplify communication signals received. In various embodiments, the respective ones of the multiple active modules may further include a first phase shift configured to shift phases of the communication signals to be transmitted and a second phase shift configured to shift phases of the communication signals received.

In various embodiments, the apparatus may further include a multi-path power divider coupled to the multiple active modules configured to divide the communication signals to be transmitted among the multiple active modules. In further embodiments, the apparatus may further include a control unit configured to adjust the first phase shift and second phase shift of the respective ones of the multiple active modules to effectively achieve a desired tilt angle.

In various embodiments, the respective ones of the multiple active modules may further include a first duplexer configured to enable the communication signals to be transmitted and the communication signals received within the respective ones of the multiple active modules to share a first communication path between the respective ones of the multiple active modules and corresponding active elements. In further embodiments, the respective ones of the multiple active modules may further include a second duplexer configured to enable the communication signals to be transmitted and the communication signals received within the respective ones of the multiple active modules to share a second communication path between the respective ones of the multiple active modules and a multi-path power divider.

In various embodiments, the respective ones of the multiple active modules may further include a first bypass configured to route the communication signals to be transmitted to the corresponding ones of the multiple active elements, and a second bypass configured to route the communication signals received to a processing unit in response to a failure of the respective ones of the multiple active modules or an electrical outage. In further embodiments, the multiple active elements and the multiple active modules may be integrated as a single unit.

In various embodiments, the apparatus may be an antenna configured for a GSM, CDMA, WCDMA, WiMAX or LTE base station. In further embodiments, the apparatus may be a base station configured for GSM, CDMA, WCDMA, WiMAX or LTE networks.

In various embodiments, a method for wirelessly transmitting a signal by an antenna assembly may include receiving by a multi-path power divider, the signal for transmission; dividing by the multi-path power divider, the signal for transmission to produce multiple divided signals for provision to multiple active modules respectively; phase-shifting and amplifying by respective ones of the multiple active modules, the multiple divided signals respectively to produce multiple amplified signals; and transmitting by multiple active elements, respective ones of the multiple amplified signals into free space. In further embodiments, the phase shifting by the respective ones of the multiple active modules may further include shifting phases of a divided signal by an amount of phase shift determined by a control unit coupled to the multiple active modules to effectively achieve a desired tilt angle.

In various embodiments, the method may further include receiving by the antenna assembly, a combined signal from a processing unit, the combined signal includes a control signal and the signal for transmission; extracting by the antenna assembly, the control signal from the combined signal and providing the control signal to a control unit to control the amount of phase shift to be applied to the multiple active modules. In further embodiments, the method may further include monitoring by a control unit, statuses of the multiple active modules and providing the statuses of the multiple active modules to a processing unit.

In various embodiments, a method for wirelessly transmitting a signal by an antenna assembly may include receiving by a multi-path power divider, the signal for transmission; dividing by the multi-path power divider, the signal for transmission to produce multiple divided signals for provision to multiple transmission modules respectively; detecting by a control unit, an electrical outage or an active module under fault condition; routing by the control unit via a bypass, a divided signal to an active element without phase shifting and amplifying the divided signal; and transmitting by the active element, the corresponding divided signals into free space.

In various embodiments, a method for wirelessly receiving a signal by an antenna assembly may include receiving by multiple active elements, multiple signals from free space; phase-shifting and amplifying by multiple active modules, the multiple signals to produce multiple amplified signals; combining by a multi-path power combiner, the multiple amplified signals into a combined signal; and providing the combined signal to an indoor unit to further process the combined signal. In further embodiments, the multiple active modules may be integrated with the multiple active elements as a single unit. In still further embodiments, the phase-shifting by multiple active modules may further include shifting phases of a signal by an amount of phase shift determined by a control unit coupled to the multiple active modules to effectively achieve a desired tilt angle.

In various embodiments, a system for wirelessly transmitting or receiving radio frequency signals may include a processing unit configured to generate radio frequency signals to be transmitted and to process radio frequency signals received; a multi-path power divider coupled to the processing unit via a feedline; multiple active modules coupled to the multi-path power divider, in which respective ones of the multiple active modules include a transmission module and a reception module, and wherein the transmission module includes a power amplifier and a first phase shift to amplify and phase shift the radio frequency signals to be transmitted, and the reception module includes a low noise amplifier and a second phase shift to amplify and phase shift the radio frequency signals received; a control unit coupled to the multiple active modules to control the phase shifting applied by the active modules to the radio frequency signals to achieve a desired tilt angle; and multiple active elements correspondingly coupled to respective ones of the multiple active modules to transmit the radio frequency signals to be transmitted into free space and to receive the radio frequency signals received from the free space. In further embodiments, the multi-path power divider, the control unit, the multiple active modules and the multiple active elements may be integrated into a single unit.

In various embodiments, the respective ones of the multiple active modules may further include a first bypass configured to route the radio frequency signals to be transmitted to corresponding ones of the multiple active elements, and a second bypass to route the radio frequency signals received to the processing unit without processing by the respective ones of the multiple active modules under failure conditions of the respective active module or electrical outages.

In various embodiments, the respective ones of the multiple active modules may further include a first duplexer configured to enable the radio frequency signals to be transmitted and the radio frequency signals received to share a first communication path between the respective ones of the multiple active modules and the multi-path power divider. In various embodiments, the respective ones of the multiple active modules may further include a second duplexer configured to enable the radio frequency signals to be transmitted and the radio frequency signals received to share a second communication path between the respective ones of the multiple active modules and the corresponding ones of the multiple active elements.

In various embodiments, the control unit may be coupled to the processing unit and further configured to monitor operation statuses of the multiple active modules and to provide the statuses to the processing unit. In further embodiments, the processing unit may be further configured to provide the control unit with the desired tilt angle.

Figure 1:
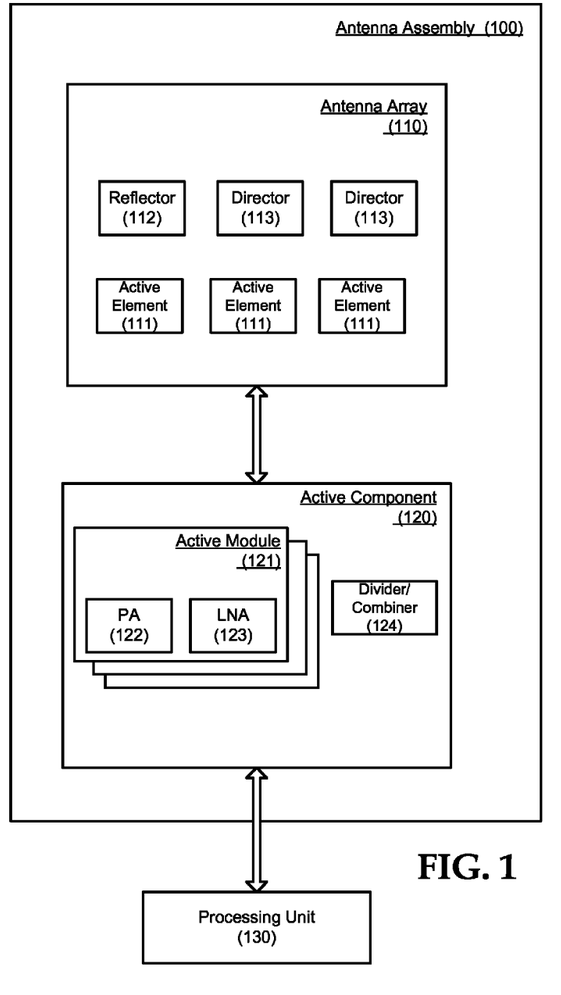
FIG. 1 is a block diagram illustrating an example active electrical tilt antenna assembly with distributed amplifiers.

FIG. 1 is a block diagram illustrating an example active electrical tilt antenna assembly 100 with distributed amplifiers in accordance with various embodiments of the present disclosure. For the illustrated embodiments, the antenna assembly 100 may include an antenna array 110 and multiple active components 120. Only one active component 120 is shown in FIG. 1 for simplicity and ease of description. The antenna array 110 may be part of the physical antenna structure for transmitting and receiving RF signals, which may be installed outdoors for a wireless communication system. The Antenna array 110 may include multiple active elements 111, sometimes referred to as radiators, and multiple parasitic elements, such as a reflector 112 and directors 113.

Embodiments of the active elements 111 may include monopole, dipole or microstrip/patch antenna elements. The active elements 111 of the antenna array 110 may transmit/receive the RF signal to/from the air, and may be coupled with the active components 120. The parasitic elements, including the reflector 112 and the directors 113, may be used to increase the gain of the antenna. The parasitic elements may not be directly connected to the active components 120 and may be optional for the antenna assembly 100.

The active components 120 may include multiple active modules 121 and a multi-path power divider/combiner 124. The active modules 121 may include a power amplifier 122 and a low noise amplifier 123. Further details of the active modules 121 and their interaction with the multi-path power divider/combiner 124 will be provided in later parts of this disclosure. The active components 120 may also include one or more power sources, control units, duplexers or filters which are not shown in FIG. 1.

In various embodiments, the active components 120 may be coupled with a processing unit 130 via a feedline. The processing unit 130 may generate RF signals to be transmitted, process RF signals received, and control/monitor the behavior of the antenna assembly 100, including the active components 120. In further embodiments, the processing unit 130 may be an indoor or outdoor base station unit.

In various embodiments, each of the active modules 121, including the power amplifier 122 and the low noise amplifier 123 of that active module 121, may be coupled to a corresponding active element 111. By using distributed power amplifiers 122 in place of a single amplifier, and by placing the power amplifiers 122 proximately close to the active elements 111 to reduce the signal loss over the feedline, the necessary power output rating for each power amplifier 122 may therefore be lowered. For example, if a 20 watt power output may be needed for a base station at the ground level when using a single power amplifier, by distributing the power requirement to six power amplifiers 122, each power amplifier 122 may only need to generate about 2 watts of power. The transmitted signal in the feedline may therefore be a low-power signal, and the power tolerance rating or power requirements for other components, such as filters, duplexers and/or the multi-path power divider/combiner 124, of the antenna assembly 100 may also be correspondingly lowered. This may reduce the total cost of the antenna assembly, which in turn may reduce the cost of the base station and the wireless communication network.

Furthermore, since the power rating for the active components 120 may be reduced, the physical dimensions of the various components of the active components 120 may also be reduced. For example, smaller dielectric filters may be used in the power amplifiers 122 in place of big cavity filters, making it possible to integrate various components of the active components 120. In various embodiments, each active component 120 may be integrated onto a printed circuit board (PCB), and the antenna assembly 100 may therefore include multiple circuit boards. In other embodiments, the active components 120 and the antenna array 110 may all be integrated onto a single PCB.

Additionally, by replacing a single low noise amplifier at the base station with multiple distributed low noise amplifiers 123, and by placing the distributed low noise amplifiers 123 proximately close to the active elements 111, the losses in the feedline may not directly deteriorate the system noise figure. Therefore, the system noise figure, system sensitivity, and system capacity may also be improved.

Even though FIG. 1 only illustrates certain numbers of active elements 111 and active components 120, in further embodiments, more or less number of components may be used. In various embodiments, some of the components illustrated in FIG. 1 may also be further divided or combined. For example, the multi-path power divider/combiner 124 may be divided into a divider portion and a combiner portion, etc.

Figure 2:
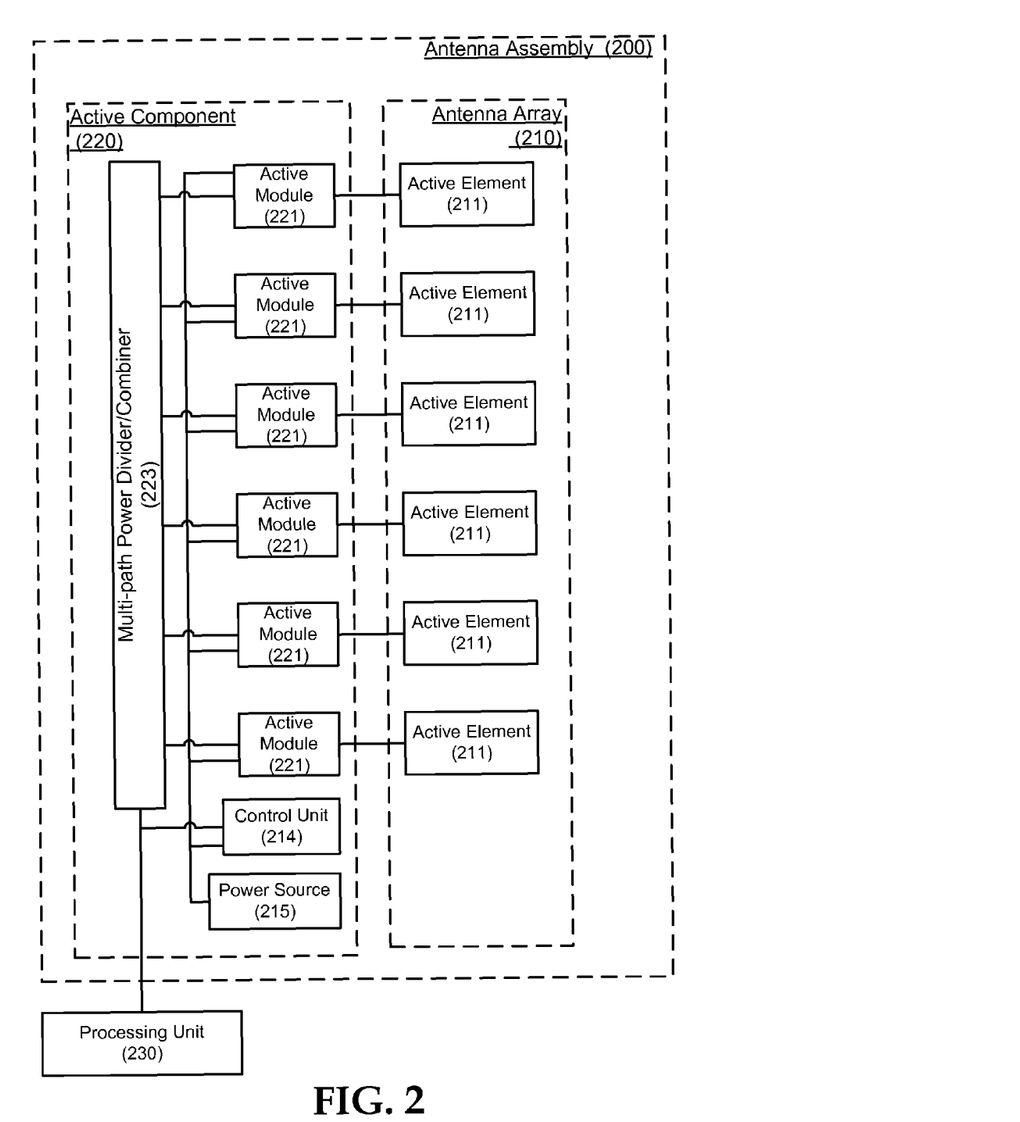
FIG. 2 is a more detailed block diagram illustrating an example active electrical tilt antenna assembly with distributed amplifiers.

FIG. 2 is a more detailed block diagram illustrating an example active electrical tilt antenna assembly 200 with distributed amplifiers in accordance with various embodiments of the present disclosure. In various embodiments, as illustrated, the antenna assembly 200 may include an antenna array 210 and an active component 220. The antenna array 210 may have six active elements 211. Each active element 211 may be coupled to an active module 221. The active modules 221 may be coupled to a multi-path power divider/combiner 223, a control unit 214, and a power source 215. A processing unit 230 may be coupled to the multi-path power divider/combiner 223 and the control unit 214, respectively.

In various embodiments, as illustrated, the RF signals generated by the processing unit 230 may first be divided by the multi-path power divider/combiner 223. The multi-path power divider/combiner 223 may provide the divided RF signals to the active modules 221. The active modules 221 may filter, phase-shift, and power amplify the divided RF signal to produce an amplified RF signal, which may then be provided to each active element 211 of the antenna array 210 for transmission over the air.

In various embodiments, RF signals received over the air by the active elements 211 of the antenna array 210 may be filtered, amplified and phase-shifted by the corresponding active module 221, then combined together by the multi-path power divider/combiner 223 and provided to the processing unit 230 for further processing. Further details of the method of operation, including transmission and reception of RF signals, by the antenna assembly 200 will be provided in later parts of the present disclosure.

In various embodiments, the power source 215 may provide power to various components of the antenna assembly 200, including the active modules 221. The control unit 214 may control the amount of phase shift introduced by each of the active modules 221 in order to achieve the desired tilt angle. As the overall tilt angle of the RF signals may be determined by the combined RF signals being transmitted by each active element 211, each active module 221 may or may not have the same amount of phase shift. In some embodiments, the control unit 214 may also monitor the status of the active modules 221 and/or active elements 211, and provide the status update to the processing unit 230.

Figure 3:
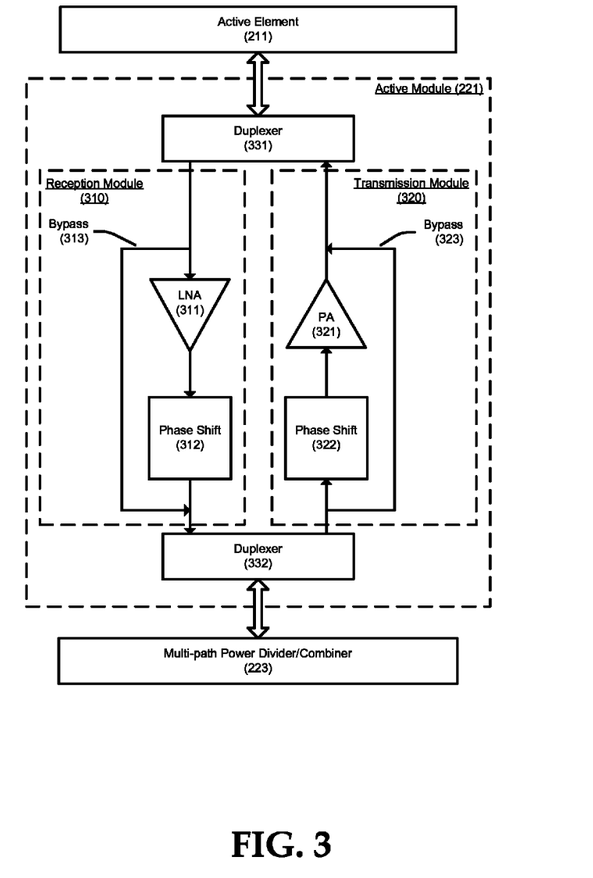
FIG. 3 is a block diagram illustrating an example active module.

FIG. 3 is a block diagram illustrating an example active module 221 in accordance with various embodiments of the present disclosure. In various embodiments, each active module 221 may be correspondingly coupled to the active element 211 of the antenna array 210. The active modules 221 may also be coupled to the multi-path power divider/combiner 223. The active module 221 may include a transmission module 320, a reception module 310, and duplexers 331 and 332. The transmission module 320 may further include a power amplifier 321, a phase shift 322 and a bypass 323. The reception module may further include a low noise amplifier 311, a phase shift 312 and a bypass 313. The active module 221 may also include other components that are not shown in FIG. 2, such as filters.

In various embodiments, the multi-path power divider/combiner 223 may provide the divided RF signals to the transmission module 320 via the duplexer 332. The duplexer 332 may enable the transmission module 320 and the reception module 310 to share a single communication path with the multi-path power divider/combiner 223. Similarly, the duplexer 331 may enable the transmission module 320 and the reception module 310 to share a single communication path with the active element 211. In various embodiments, the duplexers 332 and 331 may be frequency division duplexers if the wireless communication network is a frequency division duplex network. If the wireless communication network is a time division duplex system, then duplexers 332 and 331 may be replaced by switches.

In various embodiments, the phase shift 322 may apply the required phase shift to a divided RF signal. The exact amount of phase shift generated and apply by each phase shift 322 may be controlled by the control unit 214. Similarly, the phase shift 312 may generate and apply the required phase shift for a received RF signal before the signals are combined by the multi-path power divider/combiner 223 and provided to the processing unit 230. The phase shifts 312 and 322 may be implemented by components commonly used in integrated analog or digital circuits, such as separation diodes. The phase shifts 312 and 322 may provide higher tilt angle adjustment resolution than the method of adjusting the length of the feedline through a motor due to the relatively precise control of the phase shifts 312 and 322. In some embodiments, the tilt angle adjustment resolution may be as low as about 0.5 degrees.

In various embodiments, the power amplifier 321 may amplify the phase-shifted signal. Since the total power requirement of the antenna assembly 200 is distributed among the multiple power amplifiers 321 and the signal loss on the feedline is reduced by placing the multiple power amplifiers 321 proximately close to the active elements 211, each power amplifier 321 may only need to produce a portion of the total power output. For an antenna array with six active elements, if a 20 watt power output may be needed at the ground level in the base station when using a single power amplifier, then by using a distributed group of six power amplifiers 321, only about 2 watts of power output may need to be produced by each power amplifier 321. As dielectric filters with power tolerance up to 10 watts is commercially available today, the power amplifiers 321 may be implemented by dielectric filters that may be physically smaller and more suitable for integration.

In various embodiments, the low noise amplifier 311 may be used to amplify the RF signals received by the active elements 211 of the antenna array 210. By placing the low noise amplifier 311 proximately close to the antenna element 211, or by integrating the active module 221 with the active element 211 as a single unit, the distance between the active elements 211 and the low noise amplifiers 311 may be shortened. As such, the signal loss between the active elements 211 and the low noise amplifiers 311 may be less, which may result in superior system noise figure, better system sensitivity, and higher system capacity.

In various embodiments, the control unit 214 may monitor the active modules 221, including the transmission modules 320, the reception modules 310, and their sub-components, to ensure that the active modules 221 are operating normally as intended, and report the operating statues of the active modules 221 to the processing unit 230. If a fault is detected at a particular active module 221 by the control unit 214, the control unit 214 may, on its own initiative or under the control of the processing unit 230, enable (i.e., activate) the bypass 313 or the bypass 323. The bypass 323, when enabled, may route the RF signal to be transmitted to the active element 211 without going through the phase shift 322 or the power amplifier 321. Similarly, the bypass 313, when enabled, may route the RF signal received from the antenna array 210 to the multi-path power divider/combiner 223, and eventually to the processing unit 230, without going through the low noise amplifier 311 and the phase shift 312. The bypasses 313 and 323 may keep the antenna assembly 200 operating, albeit at a lower performance level, while the fault is being isolated and resolved by a network administrator. The control unit 214 may also enable the bypass 313 and the bypass 323 during an electrical outage. Depending on the circumstance, the control unit 214 may choose to only enable the bypass 313 and/or the bypass 323 of a particular active module 221 that is in fault, or enable the bypasses 313 and/or the bypasses 323 in all the active modules 221.

Figure 4:
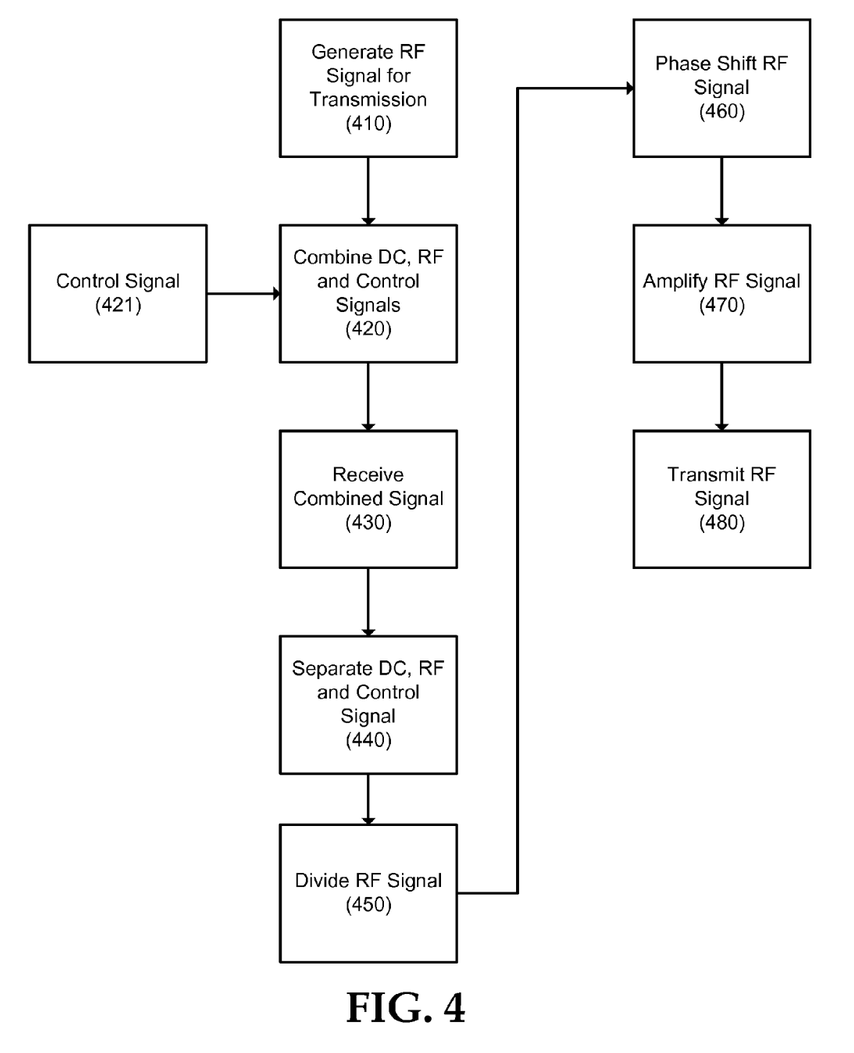
FIG. 4 is a flow diagram illustrating a portion of an example operation for transmitting RF signals.

FIG. 4 is a flow diagram illustrating a portion of the operation for transmitting RF signals, in accordance with various embodiments of the present disclosure. In various embodiments, as illustrated, the processing unit 230 may generate RF signals for transmission at block 410, and generate control signals at block 421. The control signals may include information for the control unit 214 to adjust the tilt angles of the antenna array, and/or to enable the bypasses 313 and/or 323. The RF signals and the control signals may be combined by a multiplexer, such as a bias tee, at block 420. The combined RF and control signals may be transmitted to and received by the antenna assembly 200 via a feedline at block 430. The antenna assembly 200 may first extract the control signals from the combined RF and control signals and forward the control signals to the control unit 214 at block 440. The RF signals may then be divided by the multi-path power divider/combiner 223 and distributed to the group of active modules 221 at block 450. The divided RF signals may be provided to the transmission module 320, and phase shifted by the phase shift 322 under the control of the control unit 214 at block 460. The phase shifted RF signals may be amplified by the power amplifier 321 at block 470. The amplified, phase-shifted RF signals may then be provided to each active element 211 and transmitted over the air at block 480. By being able to accept, from the processing unit 230, a combined RF and control signals, the antenna assembly 200 may be made compatible with existing base station infrastructures and may leverage existing antenna control protocols, such as protocols defined by the Antenna Interface Standards Group (AISG).

One skilled in the art will appreciate that, for this and other processes and methods disclosed herein, the functions performed in the processes and methods may be implemented in differing order. Furthermore, the described operations are only provided as examples, and some of the operations may be optional, combined into fewer operations, or expanded into additional operations without detracting from the essence of the disclosed embodiments.

Figure 5:
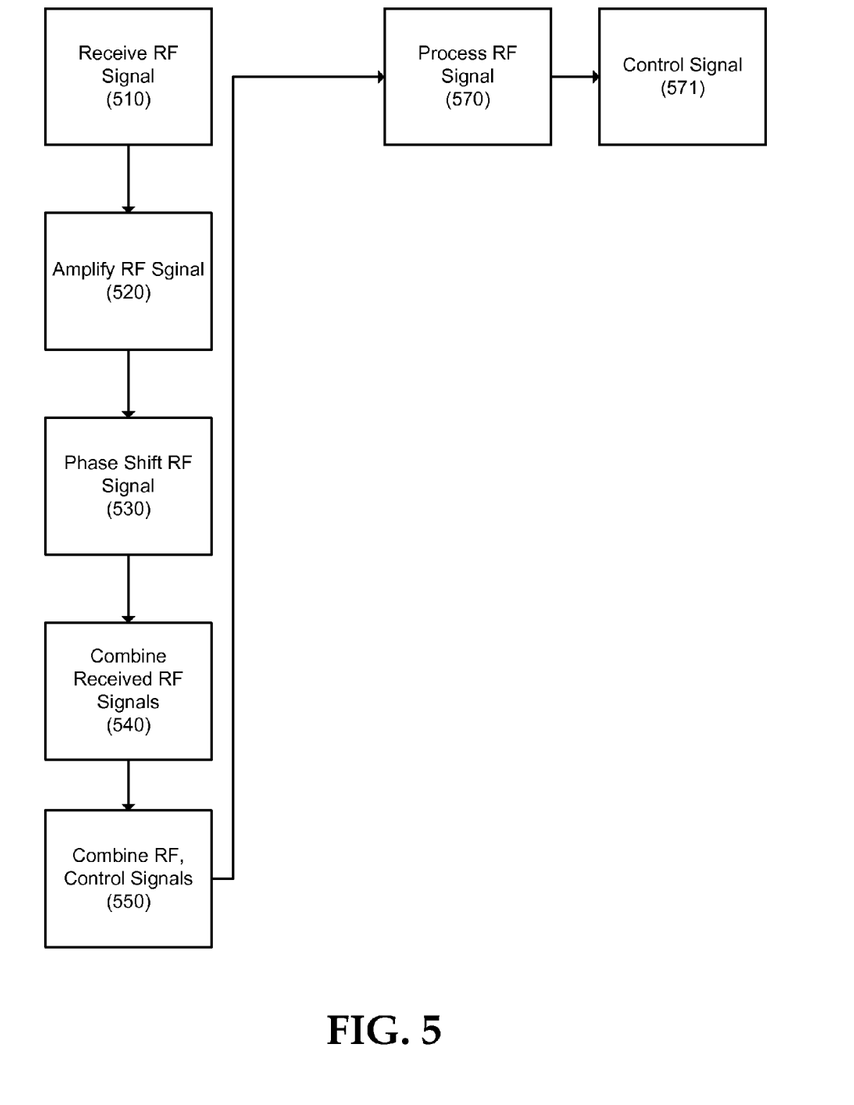
FIG. 5 is a flow diagram illustrating a portion of an example operation for receiving RF signals, all arranged in accordance with various embodiments of the present disclosure.

FIG. 5 is a flow diagram illustrating a portion of the operation for receiving RF signals, in accordance with various embodiments of the present disclosure. The RF signals may be received by the active elements 211, and forwarded to the reception module 310 at block 510. The received RF signals may be amplified by the low noise amplifier 311 at block 520, phase-shifted by the phase shift 312 at block 530, and combined by the multi-path power divider/combiner 223 at block 540. The combined received RF signals may further be combined with the control signals at block 550. The control signals may include statuses of the one or more active modules 221 that are being reported to the processing unit 230 by the control unit 214. The combined control and RF signals may be provided to the processing unit 230 and processed by the processing unit 230 at block 570. The processing unit 230 may extract the control signal from the combined control and RF signal by using a multiplexer, such as a bias tee, in block 571. The control signal may indicate to the processing unit 230 that the tilt angle of the antenna assembly 200 may need to be adjusted, or the bypasses 313 and/or 323 may need to be enabled. The processing unit 230 may subsequently issue control signals accordingly.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. An apparatus for wirelessly transmitting or receiving communication signals, the apparatus comprising:
   a plurality of active elements configured to transmit or receive communication signals in a wireless communications network;
   a plurality of active modules correspondingly coupled to the plurality of active elements and configured to cooperate with respective ones of the plurality of active elements;
   wherein respective ones of the plurality of active modules include:
      a power amplifier configured to amplify communication signals to be transmitted,
      a low noise amplifier configured to amplify communication signals received,
      a first phase shifter configured to shift phases of the communication signals to be transmitted,
      a second phase shifter configured to shift phases of the communication signals received,
      a first bypass configured to route the communication signals to be transmitted to the corresponding ones of the plurality of active elements in response to a failure of the respective ones of the plurality of active modules or an electrical outage, and
      a second bypass configured to route the communication signals received to a processing unit in response to the failure of the respective ones of the plurality of active modules or an electrical outage; and
   a control unit configured to adjust one or more of the plurality of the active elements and enable one or more of the first and second bypasses.

2. The apparatus of claim 1, further comprising a multi-path power divider coupled to the plurality of active modules configured to divide the communication signals to be transmitted among the plurality of active modules.

3. The apparatus of claim 1, further comprising a control unit configured to adjust the first phase shift and second phase shift of the respective ones of the plurality of active modules to effectively achieve a desired tilt angle.

4. The apparatus of claim 1, wherein the respective ones of the plurality of active modules further comprise a first duplexer configured to enable the communication signals to be transmitted and the communication signals received to share a first communication path between the respective ones of the plurality of active modules and corresponding active elements.

5. The apparatus of claim 1, wherein the respective ones of the plurality of active modules further comprise a second duplexer configured to enable the communication signals to be transmitted and the communication signals received to share a second communication path between the respective ones of the plurality of active modules and a multi-path power divider.

6. The apparatus of claim 1, wherein the plurality of active elements and the plurality of active modules are integrated as a single unit.

7. The apparatus of claim 1, wherein the apparatus is an antenna assembly configured for a GSM, CDMA, WCDMA, WiMAX or LTE base station.

8. The apparatus of claim 1, wherein the apparatus is a base station configured for GSM, CDMA, WCDMA, WiMax or LTE networks.

9. A method for wirelessly transmitting a signal by an antenna assembly comprising a plurality of active modules, the method comprising:
   receiving, by the antenna assembly, a combined signal including a control signal and a signal for transmission;
   dividing, by a multi-path power divider, the signal for transmission to produce a plurality of divided signals for provision to the plurality of active modules respectively;
   extracting, by the antenna assembly, the control signal from the combined signal;
   amplifying, by respective ones of the plurality of active modules, the plurality of divided signals respectively to produce a plurality of amplified signals;
   in response to the extracted control signal, adjusting, by a control unit, an amount of phase shift to be applied to the plurality of active modules; and
   transmitting, by a plurality of active elements, respective ones of the plurality of amplified and phase shifted signals.

10. The method of claim 9, wherein the amount of phase shift is determined by the control unit to effectively achieve a desired tilt angle.

11. The method of claim 9, further comprising:
   monitoring by the control unit, a status of the plurality of active modules and providing the status of the plurality of active modules to a processing unit.

12. A system for wirelessly transmitting or receiving radio frequency signals, the system comprising:
   a processing unit configured to generate radio frequency signals to be transmitted and to process radio frequency signals received;
   a multi-path power divider coupled to the processing unit via a feedline;
   a plurality of active modules coupled to the multi-path power divider, wherein respective ones of the plurality of active modules include:
      a transmission module comprising a power amplifier and a first phase shifter to amplify and phase shift the radio frequency signals to be transmitted,
      a reception module comprising a low noise amplifier and a second phase shifter, respectively configured to amplify and phase shift the radio frequency signals received, and
      a first duplexer configured to facilitate shared use of a first communication path between the respective ones of the plurality of active modules and the multi-path power divider such that the radio frequency signals to be transmitted or the received radio frequency signals can be sent over the first communication path;
   a control unit coupled to the plurality of active modules to control the phase shifting applied by the active modules to achieve a desired tilt angle; and
   a plurality of active elements correspondingly coupled to the respective ones of the plurality of active modules to transmit the radio frequency signals to be transmitted and to receive the radio frequency signals received.

13. The system of claim 12, wherein the multi-path power divider, the control unit, the plurality of active modules and the plurality of active elements are integrated into a single unit.

14. The system of claim 12, wherein the respective ones of the plurality of active modules further comprise a first bypass configured to route the radio frequency signals to be transmitted to corresponding ones of the plurality of active elements, and a second bypass to route the radio frequency signals received to the processing unit.

15. The system of claim 12, wherein the respective ones of the plurality of active modules further comprise a second duplexer configured to allow shared use of a second communication path between the respective ones of the plurality of active modules and corresponding ones of the plurality of active elements such that the radio frequency signals to be transmitted or the received radio frequency signals can be sent over the second communication path.

16. The system of claim 12, wherein the control unit is operatively coupled to the processing unit and further configured to monitor an operation status of the plurality of active modules and to provide the status to the processing unit.

17. The system of claim 12, wherein the processing unit is further configured to provide the control unit with the desired tilt angle.

* * * * *